United States Patent [19]

Wanat

[11] Patent Number: 5,454,611
[45] Date of Patent: Oct. 3, 1995

[54] STRAP INSTALLER

[75] Inventor: James Wanat, Whitewood, S. Dak.

[73] Assignee: The Big Strapper Corporation, Whitewood, S. Dak.

[21] Appl. No.: 191,879

[22] Filed: Feb. 4, 1994

[51] Int. Cl.$^6$ .................................................... B25J 1/04
[52] U.S. Cl. ............................................. 294/24; 294/19.1
[58] Field of Search ......................... 294/1.1, 2, 10, 294/19.1, 22–24; 29/235, 241, 270, 278, 700; 81/487, 488; 410/96–98, 100, 156

[56] References Cited

U.S. PATENT DOCUMENTS

| | | | |
|---|---|---|---|
| 1,339,444 | 5/1920 | Ferguson | 294/24 |
| 1,801,817 | 4/1931 | Martin | 294/19.1 |
| 2,811,127 | 10/1957 | Palsson | 294/19.1 X |
| 3,424,077 | 1/1969 | DeHaan | 294/19.1 X |
| 3,469,878 | 9/1969 | DeHaan | 294/19.1 |
| 3,819,221 | 6/1974 | O'Connor | 294/1.1 X |
| 3,936,088 | 2/1976 | Williams | 294/19.1 |
| 4,153,286 | 5/1979 | Piper et al. | 294/19.1 |
| 4,801,166 | 1/1989 | Jordan et al. | 294/10 X |

*Primary Examiner*—Johnny D. Cherry
*Attorney, Agent, or Firm*—Welsh & Katz, Ltd.

[57] ABSTRACT

A strap installer to extend the reach of a worker on the ground to allow the worker to engage a hook of a strap on an overhead tarpaulin. The strap installer has an extension element, a strap holder, and a securing element. The extension element is an elongated member that extends the reach of a worker on the ground. The strap holder holds a portion of the strap near the hook to be attached to the tarpaulin, and is removably secured to one end of the extension element. The securing element secures a free end of the strap to the extension element.

14 Claims, 2 Drawing Sheets

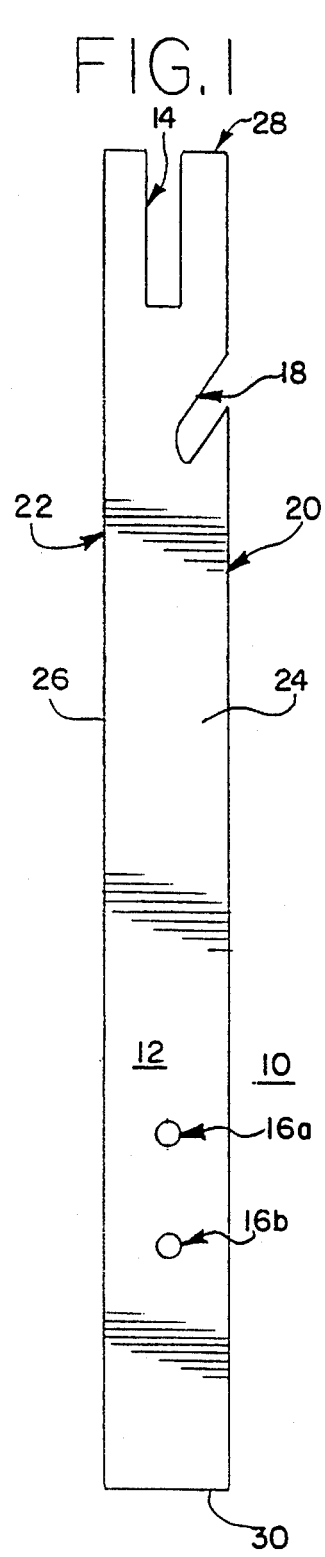
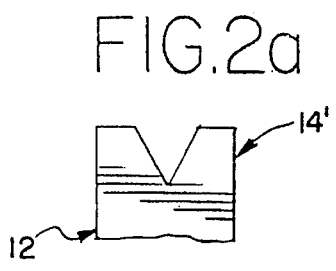
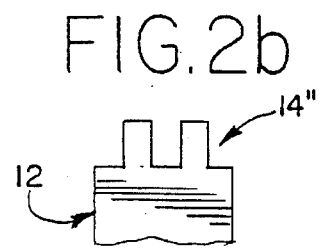
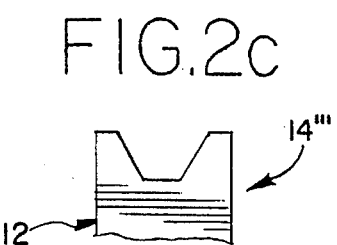
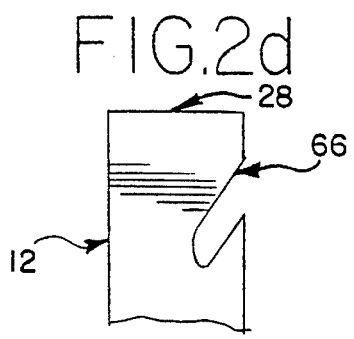
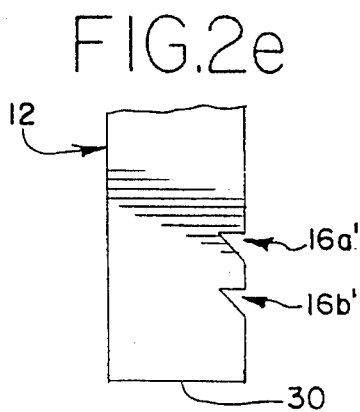
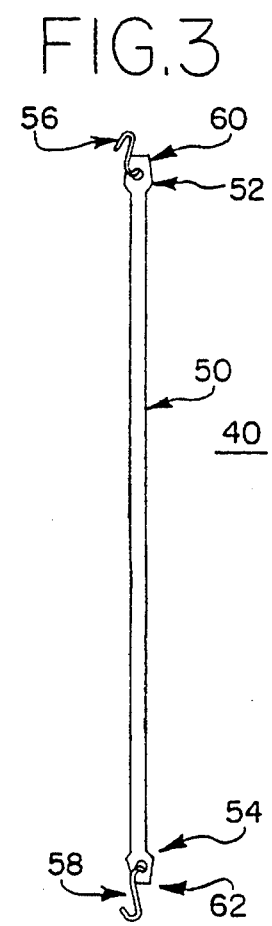
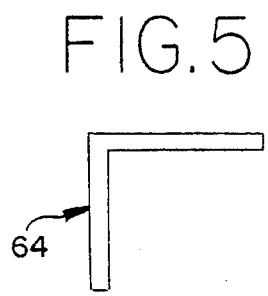

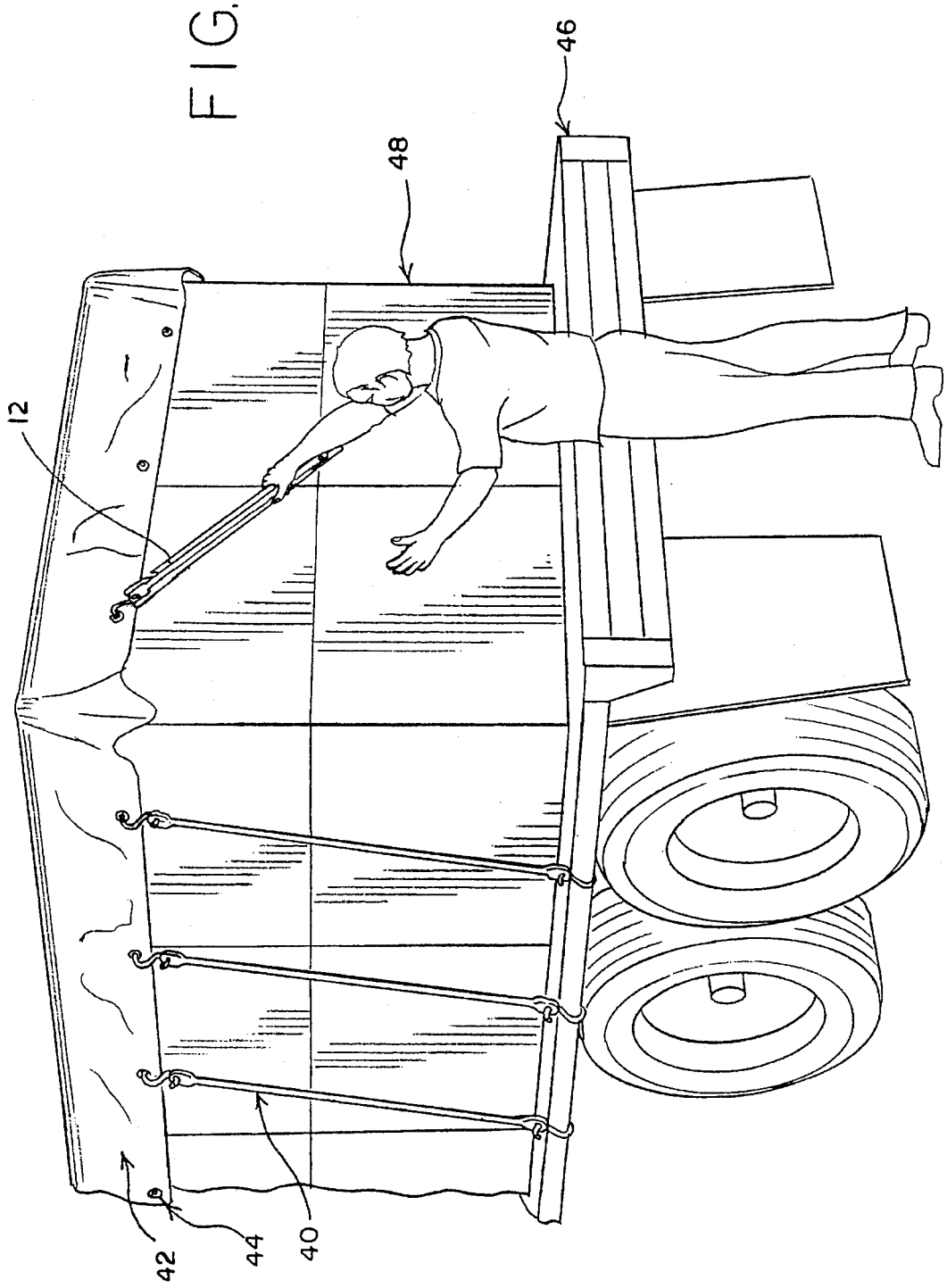

STRAP INSTALLER

This invention relates generally to the handling of restraining straps. More particularly, the invention relates to a tool for safely applying tie-down straps to secure tarpaulins to trucks and to other vehicles and structures.

BACKGROUND OF THE INVENTION

Flat-bed tractor-trailer combinations are a common form of transportation for many types of cargo. During transit, the cargo on a trailer may be protected from the elements by a cover, such as a tarpaulin. The tarpaulins are typically secured to a trailer's frame with rubber tie-down straps, also known as "bungee" cords. The rubber straps have "S" hooks at each end. One S-hook is inserted in an O-ring grommet on the tarpaulin, and the other is attached to the trailer. The rubber straps are elastic, and stretch to accommodate various tarpaulin and cargo sizes. Depending on the cargo to be covered, an average trailer requires 30–50 rubber straps.

Installing the rubber straps exposes a worker to a considerable risk of accident and injury. Typically, the O-ring grommets are out of the reach of the person attempting to secure the tarpaulin. Prior to the invention of the apparatus disclosed herein, the two most likely ways of reaching the O-rings were jumping at the tarpaulin or climbing over the cargo.

First, a worker could jump up to the level of an O-ring and swipe at it with an S-hook from a rubber strap. Hopefully, the S-hook would engage the O-ring. If the worker missed, however, the S-hook might partially engage, stretch out the strap, and then release, snapping back and striking the worker in the head or upper body. Moreover, jumping up and down along the side of a truck poses threats to safety regardless of whether the strap is successfully engaged. For example, the straps are typically adjusted outside, where rain, sleet, or snow could make footing treacherous. Also, if the straps are adjusted in a truck servicing area, one encounters the increased likelihood that oil, fuel, coolant, or other fluid spills will make for hazardous footing. Repeated jumping in areas with poor traction increases the potential for slipping, falling, and resultant injuries.

Second, a person could crawl up on top of the trailer, the cargo, and the tarpaulin, insert the strap's S-hooks into the tarpaulin's O-rings from above, and then climb or jump down to complete the job from below. This method exposes the worker to an even higher risk of slipping and falling. Tarpaulins are even slicker than pavement during inclement weather, and the increased height of the truck can only serve to intensify any injuries a worker may have after a fall.

Accordingly, there is a need for a tool which will serve to facilitate the safe and convenient installation of rubber straps on a tarpaulin and trailer. The tool should allow a worker to install the straps on tarpaulin O-ring grommets that are ordinarily out of reach, without requiring a worker to leave the safety of ground level.

SUMMARY OF THE INVENTION

Therefore, it is an object of the present invention to provide an inexpensive and easy to use tool that facilitates the safe installation of rubber straps on a tarpaulin that otherwise cannot be reached from ground level.

More specifically, it is an object of this invention to provide a strap installer that extends the reach of a worker on the ground to allow the worker to engage the hook of a securing strap to an O-ring or other receptacle on an overhead tarpaulin.

In accordance with the present invention, all of these objects, as well as others not herein specifically identified, are achieved generally by the present strap installer, wherein the strap installer has an extension element, a strap holder, and a hook holder. More particularly, the extension element is an elongated member that extends the reach of a worker on the ground. The strap holder holds a portion of the strap near the S-hook to be attached to the tarpaulin, and is fixed to one end of the extension element. The hook holder holds a free end of the strap to the extension element.

BRIEF DESCRIPTION OF THE DRAWINGS

Further objects of the invention, taken together with additional features contributing thereto and advantages occurring therefrom, will be apparent from the description of the invention when read in conjunction with the accompanying drawings, wherein:

FIG. 1 shows a side view of the present strap installer;

FIG. 2a–2e are partial views showing alternative embodiments of portions of the present invention;

FIG. 3 shows a rubber strap of the type typically used in the application of the present strap installer;

FIG. 4 is a perspective drawing showing a worker installing straps on a truck using the present strap installer; and FIG. 5 shows a typical strap protector.

DETAILED DESCRIPTION OF THE INVENTION

Referring to FIG. 1, a strap installer 10 includes an extension element 12, a strap holder or receptacle 14, hook receptacles 16a and 16b, and a strap protector receptacle 18. The extension element 12 is the foundation of the strap installer 10. The remaining elements of the strap installer 10 are located in or on the extension element 12.

The extension element 12 is a rigid, elongated member having two sides, respectively designated 20 and 22, and two surfaces, respectively designated 24 and 26, and a strap end 28 and a handle end 30. Surfaces 24 and 26 are useful for marking the strap installer 10 with promotional advertising or other messages. Preferably, the extension element 12 is made from wood, and is approximately 36" long, 1" wide, and ½" thick. Alternative materials for the construction of extension element 12, such as plastic, fiberglass reinforced composites, and various metals, are contemplated. However, wood exhibits a combination of ease of manufacture, low cost, and durability that has been found superior to other known materials. Moreover, the use of a metal extension element 12 could be extremely hazardous in the vicinity of a thunderstorm. Different dimensions for the extension element 12 may also be used, depending on the composition of the extension element 12 and other requirements without departing from the scope of the present invention. In particular, the length of the extension element 12 may vary with individual preferences and the height of the trailer to be covered.

The strap receptacle 14, the hook receptacles 16a and 16b, and the strap protector receptacle 18 are mounted on or in the extension element 12. The strap receptacle 14 includes a narrow passage at the strap end 28 of the extension element 12. Preferably, the strap receptacle 14 is a ¼" groove cut into the strap end 28. Alternatively, a pair of adjacent fingers or other types of extensions, respectively designated 14', 14", and 14''' (shown in FIGS. 2a–2c), defining a similarly sized gap may be used. More specifically, as shown in the several figures, the strap receptacle 14 of the present invention can be configured as a V-shaped groove or strap receptacle 10' (FIG. 2a), a pair of adjacent fingers 14" (FIG. 2b) or a U-shaped groove or strap receptacle 14''' (FIG. 2c). It is also contemplated that the strap receptacle 14 can be located along the sides 20 or 22 (shown in FIG. 2d), in which case the strap receptacle 66 should be angled toward the strap end 28 of the extension element 12.

A hook receptacle can be formed by drilling or otherwise forming an aperture into the surface 24 of extension element 12. The preferred embodiment of the strap installer 10 includes two apertures to form hook receptacles, respectively designated 16a and 16b, located on the extension element 12, approximately two-thirds to three quarters of the length of the extension element 12 away from the strap receptacle 14. Alternatively, hooks or notches 16a', 16b', (shown in FIG. 2e) are contemplated as providing hook receptacles. Optimal distance of the hook receptacles 16a and 16b from the strap receptacle 14 is dependent on the length of strap 40 (see FIG. 2) to be used. It is preferred that the distance between the strap receptacle 14 and the hook receptacle 16a or 16b be substantially equal to the length of the strap 40 to be used with the strap installer 10. Therefore, an absolute distance between the strap receptacle 14 and the hook receptacles 16a and 16b varies with particular applications and is not disclosed herein.

The strap protector receptacle 18 is a notch cut into the extension element 12 within approximately a one quarter length of the extension element 12 to the strap end 28. The preferred angle of the strap protector receptacle 18 is approximately 45 degrees of inclination relative to the strap end 28 of the extension element 12. In the preferred embodiment, the strap protector receptacle 18 will be formed into one of the sides 20 or 22 of the extension element 12.

Referring now to FIG. 4, in operation, the strap installer 10 is typically used to install rubber straps 40 to secure a tarpaulin 42 with grommets 44 on a trailer 46 carrying cargo 48. As shown in FIG. 3, a typical rubber strap, generally indicated at 40, has an elastic body 50, two shanks respectively designated 52 and 54, one located at each end of the elastic body 50, and two hooks, respectively designated 56 and 58. Hook 56 is inserted into shank 52, and hook 58 is inserted into shank 54.

Referring now to FIGS. 1, 3, and 4, shank 52 at an upper end 60 of the rubber strap 40 is inserted into the strap receptacle 14. The strap receptacle 14 slightly compresses and frictionally engages the strap 40, holding the strap 40 to the strap installer 10. The hook 58 on a lower end 62 of the strap 40 is then inserted into one of the hook receptacles, 16a or 16b, on the handle end 30 of the extension element 12. Note that a plurality of hook receptacles may be provided to accommodate a variety of strap 40 lengths. The hook receptacle 16a or 16b engages the hook 58, holding the lower end 62 of the strap 40 to the strap installer 10.

With the strap 40 held to the strap installer 10, the extension element 12 is then lifted, raising the strap receptacle 14, and therefore the upper end 60 of the strap 40, up to a grommet 44 on a tarpaulin 42. The hook 56 on the upper end 60 of the strap 40 is free for insertion into the grommet 44 because the strap receptacle 14 engages the shank 52 of the rubber strap 40, and not the hook 56 itself. Once the upper hook 56 is inserted and engaged in one of the grommets 44, a tug on the extension element 12 releases the shank 52 from the strap receptacle 14.

During installation of the hook 56, the lower hook 58 remains located in the hook receptacle 16a. Because the hook 58 remains attached to the extension element 12, namely in the hook receptacle 16a or 16b, the worker can, using the extension element 12, pull the strap 40 down towards himself, grasp the lower end 62, and secure the hook 58 to an appropriate place on the trailer 46. Accordingly, after hook 56 is installed and the shank 52 is released from the strap receptacle 14, the hook receptacle 16a or 16b conveniently retains hook 58 for the worker. This is especially useful if the strap 40 must be stretched from the tarpaulin 42 to reach the worker on the ground. Hook 58 is then removed from the hook receptacle 16a or 16b and attached to the trailer 46, completing the installation of strap 40. The hook receptacle 16a also prevents the otherwise free lower end 62 of the strap 40 from waving about and causing injury. The above described installation procedure for the strap 40 will be repeated for the remaining straps until the tarpaulin 42 is properly secured to the trailer 46. The entire strap installation process can be accomplished with a worker remaining safely at ground level.

The present invention, although described here in terms of hooks and complementary grommets, is not limited to actual hooks and grommets. "Hooks" refers to fastening devices in general, and it is intended that the present invention can be used with other fastening devices on straps and tie-down points on covers. Moreover, use of the device is not limited to flat-bed trailers. There are many alternative commercial and non-commercial uses for the present invention, such as camping, covering luggage on top of a van, and covering industrial machinery, among others. Finally, although installation of straps is described, the reverse procedure of removing straps is also contemplated.

Referring now to FIGS. 1 and 5, if nylon straps (not shown) are used to secure the cargo 48, strap protectors 64 may be required to prevent the cargo 48 from chafing the nylon straps along the edges or corners over which the nylon straps may be extended. A strap protector 50 may be inserted in the strap protector receptacle 18. The strap installer 10 is then used to position the strap protector 64 along the edges, corners, or wherever else they may be needed to protect the nylon straps.

The strap protector receptacle 18 may serve a dual purpose. As noted above, the preferred placement of the strap receptacle is on the strap end 28 of the extension element 12. However, as shown in FIG. 2d, it is also contemplated that the strap receptacle, here designated as 66, can be set into the sides 20 or 22 of the extension element 12. The side located strap receptacle 66 is preferably angled toward the strap end 28 of the extension element 12. A void cut as required to form a strap protector receptacle 18 substantially fulfills the requirements of the side mounted strap receptacle 66. Thus, the functions of the strap protector receptacle 18 and the strap receptacle 14 may be combined into the side-mounted strap receptacle 66.

By facilitating the installation and removal of rubber tie down straps from ground level, the present invention permits quicker and safer covering of cargo. The present invention speeds installation and removal because the strap installer allows a worker to quickly progress from one strap to another without having to jump at a grommet or crawl on top of a trailer. Moreover, the invention removes some of the more dangerous aspects of strap installation and removal by facilitating the procedures without the worker's feet having to leave the ground. Also, the low material and manufacturing costs for a wooden strap installer make for a highly cost effective alternative to expensive injuries, missed work, workers' compensation claims, and other costs associated with prior methods of strap installation and removal.

While a preferred embodiment and various alternative features of the present invention have been shown and described, it should be understood that there is no intent to limit the invention by such disclosure, but rather it is intended to cover all modifications and alternative constructions that may fall within the spirit and the scope of the invention as described in the appended claims.

What is claimed is:

1. A strap installer for securing a cargo cover to a vehicle, the strap installer comprising:

a strap having an engagement means at least at one end thereof for engaging a fastening element located on the cargo cover;

an elongated extension element having first and second ends;

a strap holding means for securely engaging said strap along a portion of said one end of said strap, said strap holding means being located along said first end of said extension element and being configured for easily disengaging said strap when so desired; and said strap holding means together with said extension element permitting a proper orientation and alignment of said engagement means of said strap with respect to said fastening element of the cargo cover when it is desired to engage said fastening element with respect to said engagement means.

2. The strap installer of claim 1, wherein said strap holding means comprises a groove formed in said first end of said extension element.

3. The strap installer of claim 1, further comprising:

fastener holding means for securely, disengagably holding a second end of said strap to enable said strap to be grasped and then secured to a securing element located on the vehicle, said fastener holding means located proximate to said second end of said extension element.

4. The strap installer of claim 3, wherein said fastener holding means comprises at least one aperture formed through said extension element.

5. The strap installer of claim 1, wherein said strap holding means comprises a groove formed in said first end of said extension element, and said groove is substantially aligned with a lengthwise axis of said extension element.

6. The strap installer of claim 5, wherein said groove is U-shaped.

7. The strap installer of claim 5, wherein said groove is V-shaped.

8. The strap installer of claim 1, wherein said strap holding means comprises a plurality of fingers fixed to the first end of said extension element.

9. The strap installer of claim 8, wherein said fingers are substantially aligned with a lengthwise axis of said extension element.

10. A strap installer for securing a cargo cover to a vehicle, the strap installer comprising:

an elongated extension element, having first and second ends;

a strap having a first engagement means formed along one end of said strap for engaging a fastening element located on the cargo cover;

a groove formed in said first end of said extension element to securely, disengagably hold a portion of said strap adjacent to said first engagement means, said groove being substantially aligned with the lengthwise axis of said extension element;

said groove together with said extension element permitting a proper orientation and alignment of said first engagement means with respect to said fastening element of the cargo cover when it is desired to engage said fastening element with said engagement means; and fastener holding means for holding a second end of said strap to enable said strap to be grasped and then secured to a securing element located on the vehicle, said fastener holding means located proximate to said second end of said extension element.

11. The strap installer of claim 10 wherein said fastener holding means comprises at least one aperture adapted to receive a fastener from the strap, said aperture set in said extension element proximate to said second end of said extension element.

12. The strap installer of claim 10, further comprising an angled notch formed proximate to said first end of said extension element, said notch inclined at a substantially 45 degree angle to said lengthwise axis of said extension element, said notch configured to receive a strap protector for placement at locations where said strap may be subject to friction that would otherwise cause said strap to erode and eventually tear.

13. The strap installer of claim 10, wherein said extension element is constructed from wood.

14. An apparatus for engaging and holding a strap, said apparatus comprising:

an elongated extension element having first and second ends;

a groove formed in said first end of said extension element to securely, disengagably hold a portion of the strap, said groove being substantially aligned with the lengthwise axis of said extension element;

said groove together with said extension element permitting a proper orientation and alignment of said strap when it is desired to engage said strap to a fastening element located on the item to which the strap is being installed;

at least one aperture adapted to receive a second end of the strap, said aperture formed in said extension element proximate to said second end of said extension element, said aperture enabling said strap to be grasped and then manipulated as desired to complete the securing of said strap; and an angled notch formed proximate to said first end of said extension element, said notch inclined at a substantially 45 degree angle to said lengthwise axis of said extension element, said notch configured to receive a strap protector for placement at predetermined locations where the strap may be subject to friction that would cause the strap to erode and eventually tear.

* * * * *